(12) United States Patent
Bhaskar et al.

(10) Patent No.: US 11,962,354 B2
(45) Date of Patent: *Apr. 16, 2024

(54) HYBRID SPACE-FIBER QUANTUM NETWORKS FOR WIDESPREAD ENTANGLEMENT DISTRIBUTION

(71) Applicant: Amazon Technologies, Inc., Seattle, WA (US)

(72) Inventors: Mihir Keshav Bhaskar, Cambridge, MA (US); Antia Lamas Linares, Austin, TX (US); David Sarkis Levonian, Cambridge, MA (US); Bartholomeus Johannes Machielse, Somerville, MA (US); Oskar Jon Painter, Sierra Madre, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,247

(22) Filed: Apr. 28, 2023

(65) Prior Publication Data
US 2023/0327780 A1    Oct. 12, 2023

Related U.S. Application Data

(63) Continuation of application No. 17/548,254, filed on Dec. 10, 2021, now Pat. No. 11,641,242.

(51) Int. Cl.
*H04B 10/00* (2013.01)
*G06N 10/40* (2022.01)
(Continued)

(52) U.S. Cl.
CPC ............. *H04B 10/70* (2013.01); *G06N 10/40* (2022.01)

(58) Field of Classification Search
CPC ..................................................... H04B 10/70
See application file for complete search history.

(56) References Cited

U.S. PATENT DOCUMENTS

| 8,781,334 B2 * | 7/2014 | Munro ................... G06N 10/00 398/64 |
| 9,858,531 B1 | 1/2018 | Monroe |
| (Continued) | | |

FOREIGN PATENT DOCUMENTS

CN    112332984 A    2/2021

OTHER PUBLICATIONS

Li Zhonghui et al: "Building a large-scale and wide-area quantum Internet based on an OSI-alike model", China Communications, China Institute of Communications, Nov. 2, 2021, pp. 1-14, vol. 18, No. 10, Piscataway, NJ, USA.
(Continued)

*Primary Examiner* — Daniel G Dobson
(74) *Attorney, Agent, or Firm* — Alexander A. Knapp; Kowert, Hood, Munyon, Rankin & Goetzel, P.C.

(57) ABSTRACT

A system and method for providing quantum entanglement using a hybrid space-fiber quantum network are described. The hybrid space-fiber quantum network includes a communications hub located proximate to an optical ground station and also includes an aerial entangled particle source, such as an entangled photon source attached to a satellite, drone, aircraft, etc. An atmospheric or free-space channel is used to distribute quantum entanglement between optical ground stations that are separated by geographic distances, via the aerial entangled particle source. Also, fiber optic links are connected to the communications hub located proximate to the optical ground station. The communications hub includes optical switches that enable any of the fiber optic links connected to the communications hub to receive or send distributed quantum entanglement to a (Continued)

remotely located recipient endpoint via the atmospheric or free-space channel.

20 Claims, 13 Drawing Sheets

(51) Int. Cl.
*H04B 10/70* (2013.01)
*H04J 14/00* (2006.01)

(56) References Cited

U.S. PATENT DOCUMENTS

| | | | |
|---|---|---|---|
| 10,971,672 | B2 | 4/2021 | Olivadese |
| 11,200,508 | B2 | 12/2021 | Reagor |
| 11,288,587 | B2 | 3/2022 | Paik |
| 11,641,242 | B1 | 5/2023 | Bhaskar et al. |
| 2006/0062392 | A1 | 3/2006 | Lee et al. |
| 2020/0396067 | A1 | 12/2020 | Barker |
| 2021/0105135 | A1* | 4/2021 | Figueroa ............... H04L 9/0855 |
| 2021/0176055 | A1 | 6/2021 | Rahman |
| 2021/0342729 | A1 | 11/2021 | Scheer |
| 2022/0026195 | A1* | 1/2022 | Fertig ................... H04B 10/29 |
| 2023/0188548 | A1 | 6/2023 | Bhaskar et al. |

OTHER PUBLICATIONS

U.S. Appl. No. 18/478,809, filed Sep. 29, 2023, Mihir Keshav Bhaskar, et al.
U.S. Appl. No. 18/478,794, filed Sep. 29, 2023, Mihir Keshav Bhaskar, et al.
K. Boone, et al., "Entanglement over global distances via quantum repeaters with satellite links," arXiv preprint: arXiv: 1410.5384v1 [quant-ph] 2014, pp. 1-8.
Jasminder S. Sidhu, et al., "Advances in Space Quantum Communications," IET Research Journals, © The Institution of Engineering and Technology 2015, pp. 1-26.
Sheng-Kai Liao, et al. "Satellite-relayed intercontinental quantum network," Physical Review Letters 120, 030501 (2018), pp. 1-4.
Mustafa Gündoğan, et al., "Proposal for space-borne quantum memories for global quantum networking, " www.nature.com/npjqi, npj Quantum Information vol. 7, Article No. 128 (2021), pp. 1-10.
M. K. Bhaskar, et al., "Experimental demonstration of memory-enhanced quantum communication," Nature | vol. 580 | 2020, pp. 60-76.
Boone et al, "Entanglement over global distances via quantum repeaters with satellite links", Physical Review A 91 (2015), arXiv: 1410.5384 [quant-ph], pp. 1-8.
Sidhu et al, "Advances in Space Quantum Communications", IET Research Journals, arXiv:2103.12749 (2021), pp. 1-26.
Gundogan et al, "Proposal for space-borne quantum memories for global quantum networking," NPJ Quantum Information 7:128 (2021), pp. 1-10.
Pirandola, "Satellite quantum communications: Fundamental bounds and practical security", Physical Review Research 3, 023130 (2021), Published by the American Physical Society, pp. 1-29.
Harney and Pirandola, "Optimal Performance of Global Quantum Networks", arXiv:2104.10701 (2021), pp. 1-14.
Liao et al, "Satellite-Relayed Intercontinental Quantum Network," Physical Review Letters 120, 030501 (2018), arXiv: 1801.04418 [quant-ph], pp. 1-10.
U.S. Appl. No. 17/548,422, filed Dec. 10, 2021, Antia Lamas Linares, et al.
U.S. Appl. No. 17/548,418, filed Dec. 10, 2021, Mihir Keshav Bhaskar, et al.
Gundogan et al, "Space-borne quantum memories for global quantum communication," arviv.org, Jun. 18, 2020, pp. 1-11, Cornell University Library, Ithaca, NY.
Sumeet Khatri, et al, "Spooky action at a global distance: analysis of space-based entanglement distribution for the quantum internet," arxiv.org, Jan. 11, 2021, pp. 1-22, Cornell University Library, Ithaca, NY.
International Search Report and Written Opinion mailed Oct. 31, 2023 in PCT/US2022/080923, Amazon Technologies, Inc., pp. 1-13.

* cited by examiner

HYBRID SPACE-FIBER QUANTUM NETWORKS FOR WIDESPREAD ENTANGLEMENT DISTRIBUTION

This application is a continuation of U.S. patent application Ser. No. 17/548,254, filed Dec. 10, 2021, which is hereby incorporated by reference herein in its entirety.

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

Figure 1A:
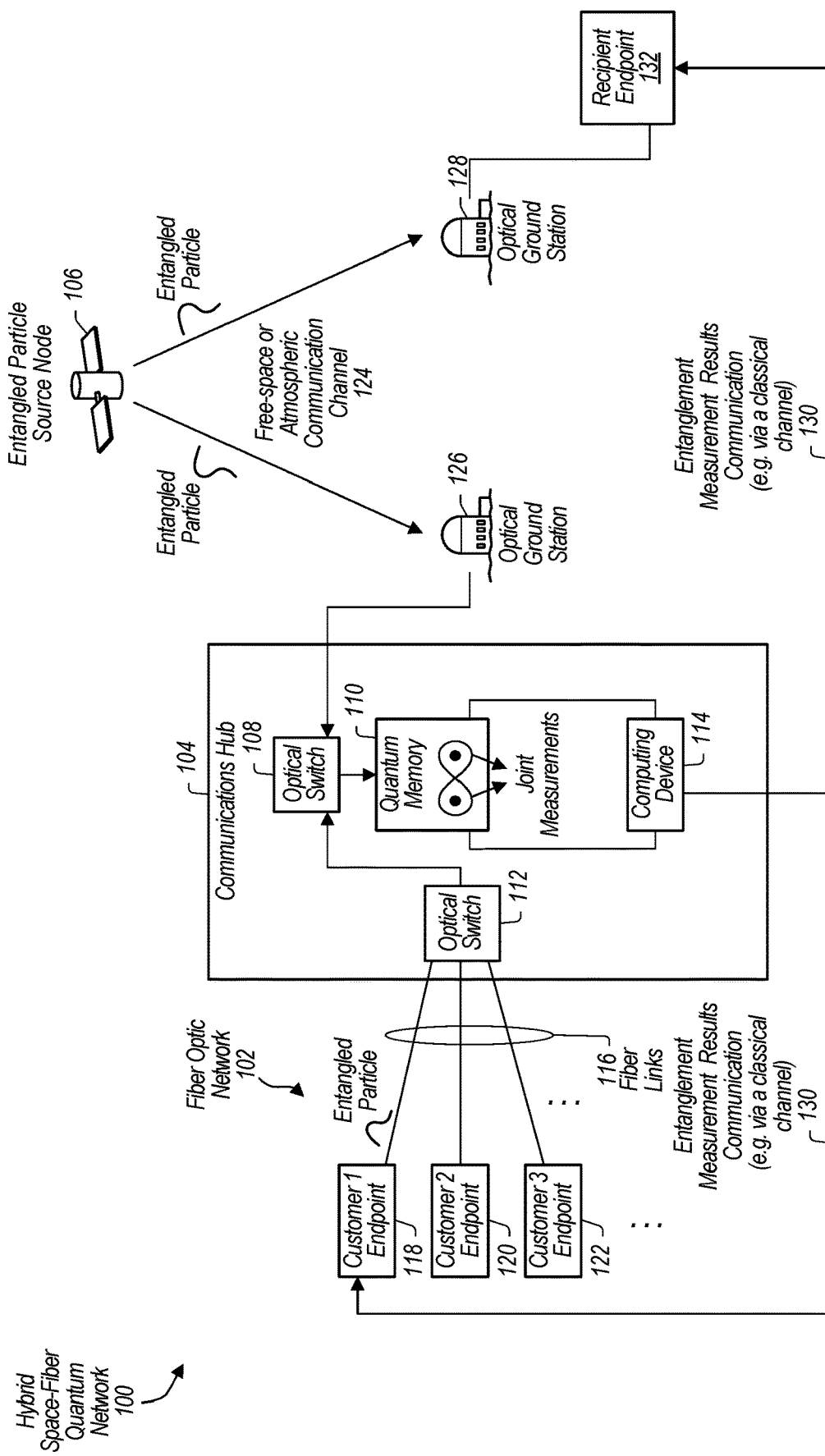
FIG. 1A illustrates a hybrid space-fiber quantum network that includes a free-space or atmospheric communication channel, multiple fiber optic communication channels, a communications hub connecting the free-space or atmosphere communication channel and the fiber optic communications channels, and one or more quantum memory devices located proximate to the communications hub, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for providing distributed quantum entanglement via a hybrid space-fiber quantum network. The hybrid space-fiber quantum network comprises intermediate nodes that connect endpoints between which quantum entanglement is distributed. For example, the intermediate nodes may connect atmospheric or free-space communication channels to fiber optic communication channels.

In some embodiments, a hybrid space-fiber quantum network includes intermediate nodes comprising a photon source configured to distribute photons via an atmospheric or free-space communication channel, such as a photon source attached to a satellite, drone, airplane, etc. In some embodiments, the photon source generates entangled photon pairs and distributes respective ones of the photons of a given entangled pair to recipient nodes separated by large geographic distances, such as optical ground stations that are geographically separated from one another. For example, a photon source attached to a satellite may distribute a first photon of an entangled pair to a first optical ground station proximate to a facility of a service provider network, such as a data center that hosts resources of the service provider network. The photon source attached to the satellite may additionally distribute a second photon of the entangled pair to a second optical ground station located proximate to a communications hub, wherein a plurality of fiber optic links are connected to the communications hub. The communications hub may act as a hub in a hub and spoke network topography that allows any of a plurality of customers at endpoints, connected to the communications hub via fiberoptic links, to receive distributed entanglement that connects the customer endpoint to the data center of the service provider network via an atmospheric or free-space communications channel. Additionally, the photon source attached to the satellite may further distribute entanglement to a second optical ground station located proximate to a second communications hub or a set of resources of the service provider network, such as the data center. Thus, the hybrid space-fiber network may include a hub and spoke topography that enables any customer of a set of customers to receive distributed quantum entanglement via a fiber optic link and an atmospheric or free-space channel, and may connect the customer via the distributed quantum entanglement to an endpoint of another customer via another communications hub of the hybrid space-fiber quantum network or may connect the customer via the distributed quantum entanglement to resources at a data center of a service provider network connected to the hybrid space-fiber quantum network.

As discussed above, in some embodiments, the second optical ground station may alternatively or additionally be connected to a second communications hub, wherein another plurality of fiber optic links are connected to the second communications hub. Thus, any of the customers with endpoints connected to the first communications hub may receive quantum entanglement distributed to any of the customers with endpoints connected to the second communications hub. In such embodiments, a hybrid space-fiber quantum network may route the distributed entanglement to the first communications hub via a fiber optic link connecting the customer endpoint to the first communications hub, extend the quantum entanglement through an atmospheric or free-space communications channel via respective optical ground stations located at the first and second communication hubs and an atmospheric or space based photon source, and then further distribute the quantum entanglement to a second customer endpoint via another fiber optic link connected to the second communications hub. Alternatively in some embodiments, the second optical ground station may be connected to a facility of a service provider, such as a data center of a service provider network, and may not necessarily include an additional communications hub, or may include an internal communications hub for communications within the data center.

In some embodiments, one or more quantum memory devices may be located proximate to the communication hubs and/or optical ground stations. In some situations, attempting to coordinate photon distribution such that a first photon transmitted to a communications hub via a fiber optic link and a second photon communicated to the communications hub via an atmospheric or free-space channel arrive at the same time may be difficult with a low probability of success. Thus, in some embodiments, a first arriving photon may be stored in a quantum memory device while waiting for a second arriving photon to arrive. As discussed in more detail below, in some embodiments, a quantum memory device may include a heralding measurement device that issues a heralding signal upon arrival of a photon in a superposition state. The heralding measurement device may detect the arrival of a photon and issue the heralding signal without collapsing the photon out of a superposition state. Also, the heralding measurement may not reveal additional information about the photon other than the fact that it has arrived at the quantum memory device.

In some embodiments, a communications hub, and/or quantum memory device associated with a communications hub, may include one or more optical switches that selectively route received photons based on heralding signals. For example, in some embodiments, a first optical switch alignment of a first optical switch may look to receive a photon via an atmospheric or free-space channel. Once the photon is received via the atmospheric or free-space channel, the optical switch may be adjusted to receive a second arriving photon via a connected fiber optic link. The first and second received photons may be routed to a quantum memory device to be stored. Additionally, joint measurements may be performed on the stored photons to extend the quantum entanglement.

In some embodiments, a second optical switch may be used to align a given one of a plurality of fiber optic links connected to the communications hub to a fiber optic inlet side of the first optical switch. Thus, the first optical switch may select whether a photon is to be routed to the quantum memory device from the atmospheric or free-space channel, or the fiber optic channel. Additionally, if routing a photon into the quantum memory device via the fiber optic channel, the second optical switch may select which of a plurality of fiber optic links connected to the communications hub is to be aligned to route the photon to the fiber optic input of the first optical switch.

In some embodiments, a hybrid space-fiber quantum network may extend a set of terrestrial fiber-based quantum networks, such that the terrestrial fiber-based quantum networks are connected with one another even if separated by large geographic distances. In such hybrid space-fiber quantum networks, atmospheric or free-space communication channels may be used to span the large geographic distances and connect the respective terrestrial fiber-based quantum networks. Using atmospheric or free-space intermediate nodes for a portion of the network may be lower cost and provide better performance than installing fiber optic links that span the large geographic distances. For example, an atmospheric or free-space based communication channel may have lower communication losses than a fiber optic link, which may include one or more intermediate nodes, of a similar length. Also, when spanning large geographic distances, costs of installing respective optical ground stations and utilizing a space or aerial based photon source may be less costly than installing fiber optic cables and subsequent intermediate nodes across the large geographic distance.

In some embodiments, using such hybrid space-fiber quantum networks may also be less costly than a space quantum network. For example, utilizing both atmospheric or free-space communication channels connected to respective terrestrial fiber-based quantum networks may be less costly than a space quantum network which includes an optical ground station at each customer endpoint. In such an example, each customer could instead utilize a fiber modem device, which connects them to the hybrid space-fiber quantum network.

As discussed above, and in more detail below, the use of a quantum memory device at the interface between the fiber optic communication channel and the atmospheric or free-space communication channel may improve communication rates (such as communication bandwidth) by reducing channel loss. Thus, in some embodiments, photons may be asynchronously received and stored until respective photons of a set for which joint measurements are to be performed have arrived at the quantum memory device/communications hub.

In some embodiments, a quantum entanglement distribution service includes a hybrid space-fiber quantum network. The quantum entanglement distribution service and/or the hybrid space-fiber quantum network may include intermediate nodes located at trusted and/or non-trusted locations, where trust is based on whether or not the intermediate nodes are located within facilities controlled by a service provider or are located at facilities outside of the control of the service provider. The quantum entanglement distribution service and/or hybrid space-fiber quantum network may also comprise computing devices configured to receive a request for distributed quantum entanglement between sets of endpoints, determine a path of network links and intermediate nodes that connect the set of endpoints, and cause sets of entangled quantum particle pairs (e.g. entangled photons) to be distributed between intermediate nodes, via the determined network links, along the determined path to provide distributed quantum entanglement between the set of endpoints. Distributed quantum entanglement provides a quantum secure connection between the set of endpoints that is protected against interference or eavesdropping along the path, either at trusted or non-trusted locations. For example, in contrast to classical communications that may be intercepted or altered in a communication path, distributed quantum entanglement provides an end-to-end entangled quantum connection that can be monitored at the endpoints to ensure the communication path is not being monitored or altered.

For example, quantum particles (e.g., photons) may be in a state called superposition, wherein the quantum particles inhabit two states at the same time with different probabilities associated with each state (e.g., 0 and 1, with different probabilities associated with 0 and associated with 1). However, attempts to measure the quantum particles will cause the quantum particles to collapse from the superposition state into one or the other of the states (e.g., 0 or 1). Additionally, sets of quantum particles (e.g., photons) can be entangled such that the quantum states of the quantum particles are inextricably linked even if separated by large distances. For example, physical properties of entangled quantum particles such as position, momentum, spin, and/or polarization may be perfectly correlated across large distances when entangled. In some cases, such properties may have a correlation such as same or opposite, meaning that if a first quantum particle of an entangled pair of quantum particles has a first spin direction, it's entangled quantum particle partner may have a spin direction that is the same or opposite of the direction of the spin of the first quantum particle of the entangled pair of quantum particles. In some embodiments, a basis of measurement may also be communicated via classical communication channels, such as a basis of measurement indicating an axis on which spin is pointing. Thus, by measuring a spin direction of the first quantum particle of the entangled pair of quantum particles, one can automatically determine the spin direction of the partner quantum particle of the entangled pair of quantum particles (e.g., same or different). Any attempt to interfere with the entangled quantum particles by a third party at locations between the endpoints holding the first and second entangled particles of the entangled pair will interrupt the entanglement, wherein such interruption is detectable at the endpoints. Thus, a first customer holding an entangled particle of an entangled pair of quantum particles at a first endpoint and a second customer holding a partner entangled particle of the entangled pair of quantum particles at as second endpoint can be assured that no other party is monitoring or altering communications between the first and second endpoints by observing the entanglement and superposition states of the entangled quantum particles held at either endpoint.

While entanglement distributed between two endpoints via a single pair of entangled quantum particles may provide the benefits described above, other limitations may prevent or inhibit the use of quantum entanglement in such a way wherein communicating entities are directly connected using a single set of entangled quantum particles. For example, infrastructure costs may be inhibitive to provide direct connections using a single set of entangled photons between all parties that may wish to communicate using quantum entanglement. Also, losses along a communication link, such as optical losses along a fiber optic communication link, may limit distances that entanglement may be distributed when distributing quantum particles of a single pair of entangled quantum particles between communicating entities. One approach to dealing with such limitations involves linking together such sets of endpoints by performing quantum measurements at connecting node holding one end of a pair of entangled quantum particles and then using the measured information to relay the information being transmitted using another set of entangled quantum particles. In such an approach, quantum entanglement provides assurances that there is no eavesdropping or interference between the connecting nodes. However, the quantum entanglement is lost at the connecting nodes when the quantum measurements are taken. Thus, in such an approach, eavesdropping or interference is possible at the connecting nodes. For example, a third party could intercept or alter the information being transmitted after quantum measurements are performed at a connecting node and before the information is then relayed using a subsequent set of entangled quantum particles.

In order to overcome such short comings, in some embodiments, a quantum entanglement distribution service and/or hybrid space-fiber quantum network, distributes quantum entanglement between endpoints connected via intermediate nodes without breaking the quantum entanglement at any of the intermediate nodes. For example, instead of performing quantum measurements at an intermediate node that disrupt entanglement and/or collapse superposition, a quantum particle of a first set of quantum particles received at the intermediate node via a first network link may be stored in a quantum memory of the intermediate node. Also, a second quantum particle of a second set of quantum particles received at the intermediate node via a second network link may also be stored in the quantum memory of the intermediate node. Additionally, the intermediate node may be configured to perform joint measurements of the first and second quantum particles of the respective entangled pairs received at the intermediate node and stored in the quantum memory of the intermediate node, wherein the joint measurements do not provide any information about the quantum state of the respective quantum particles individually but instead provides information about the correspondence relationship between the two quantum particles. For example, the measurements may indicate that they have a correlation that is the same or opposite. Note, using spin as an example, such measurements do not tell the spin direction of either quantum particle, just the relationship between the two (e.g., they have the same or opposite spin directions).

In some embodiments, a quantum entanglement distribution service and/or hybrid space-fiber quantum network may include multiple such intermediate nodes with quantum memories and joint measurement capabilities. The quantum entanglement distribution service and/or hybrid space-fiber quantum network may further determine an overall entanglement relationship between quantum particles held at endpoints of distributed quantum entanglement based on joint measurements performed at one or more respective intermediate nodes. For example, if an odd number of intermediate nodes generate joint measurements indicating an opposite relationship, then the quantum entanglement distribution service may indicate to the two endpoints of the distributed entanglement that the quantum particles held at the two endpoints have an "opposite" entanglement relationship. In contrast, if the joint measurements at the intermediate nodes yield an even number of "opposite" joint measurement relationships or only "same" joint measurement relationships, then the quantum entanglement distribution service may indicate to the two endpoints of the distributed entanglement that the quantum particles held at the two endpoints have a "same" entanglement relationship. Thus, the two endpoints, can use the received quantum entanglement relationship information to determine how a measurement taken at the respective endpoint correlates to a measurement taken at the other endpoint of the distributed quantum entanglement e.g., it will be the same or opposite. Note that in such a circumstance, there is no way to determine what the quantum measurement will be based on this quantum entanglement relationship information alone, only that a quantum measurement at the other end of the distributed quantum entanglement will be the same or opposite as a measurement at an opposite end of the distributed quantum entanglement.

In some embodiments, the ability to communicate free from third-party interception or altering via distributed quantum entanglement may be used in a variety of manners. For example, a symmetric encryption key may be distributed between parties using distributed entanglement, wherein quantum measurements are taken at either end of the distributed entanglement to determine bits of the symmetric encryption key. In some embodiments, a basis of measurement may be communicated between the endpoints as well as joint measurements such as "same" or "opposite." For example, such joint measurements and/or measurement basis may be communicated via a classical communications channel. The basis of measurement may, for example, indicate an axis on which spin is pointing. However, regardless of the basis of measurement "same" or "different" can be applied to this class of entangled states, which makes measurements performed at the respective endpoints unique and is a part of the symmetric encryption key generation protocol.

In some embodiments, classical or quantum data may be communicated using distributed quantum entanglement via quantum teleportation between endpoints sharing distributed entanglement. For example, in quantum teleportation, a first party holding a quantum particle of the distributed entanglement may combine the particle of the distributed entanglement with a qubit storing quantum information that is to be teleported using a two-qubit entangling quantum logic gate. The first party may then measure a change in the particle of the distributed entanglement when combined with the qubit to be teleported. This change may be communicated to the second party holding the other end of the distributed entanglement. In some embodiments, a basis of measurement may be communicated between the endpoints, for example via a classical communications channel. The basis of measurement may, for example, indicate an axis on which spin is pointing. Note, the measurement does not indicate the actual quantum information that is being communicated, just how the entangled particle of the distributed entanglement changed when combined with the qubit storing the quantum information to be teleported. The other party holding the other particle of the distributed quantum entanglement at the other end of the distributed entanglement can then re-create the quantum information being teleported by observing how the particle of the distributed entanglement changed and knowing the measurement information communicated form the first party sending the quantum information via quantum teleportation.

Thus, in some embodiments, distributed entanglement may be used to distribute data such as bits of an encryption key, data such as quantum information to be used by a quantum computer, or data such as may be used by a classical computer. The data may be transmitted via a quantum secure connection that can be positively verified to be secure such that there is a guarantee that no other party is eavesdropping or altering the data being transmitted. Thus, customers of a quantum entanglement distribution service and/or hybrid space-fiber quantum network can directly and easily verify that their data is never exposed through the communications pipeline, independent of any third-party hardware or service provider. Such communications may be referred to as "trust-less" communications because the communicating parties do not need to rely on trust in a service or infrastructure provider to provide security of the communications infrastructure. In some embodiments, an entanglement distribution service and/or hybrid space-fiber quantum network may include intermediate nodes at varied geographic locations that enable entanglement distribution across continents (e.g., the continental United States). Also, a hybrid space-fiber quantum network includes satellite based intermediate nodes that enable entanglement distribution across continents and/or between continents (e.g., via satellite network links).

In some embodiments, customers of a quantum entanglement distribution service and/or hybrid space-fiber quantum network may possess or may receive from the distributed entanglement service a photon detector that connects to a fiber optic channel. Such a photon detector may enable a customer to communicate via distributed entanglement. In some embodiments, a customer may not need to acquire or possess a quantum computer, but may instead couple a classical computer to a photon detector in order to communicate using distributed entanglement.

In some embodiments, quantum memories included in intermediate nodes may be implemented using various quantum memory technologies, such as silicon-vacancy in diamond (SiV), nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc.

FIG. 1A illustrates a hybrid space-fiber quantum network that includes a free-space or atmospheric communication channel, multiple fiber optic communication channels, a communications hub connecting the free-space or atmosphere communication channel and the fiber optic communications channels, and one or more quantum memory devices located proximate to the communications hub, according to some embodiments.

In some embodiments, a hybrid space-fiber network, such as hybrid space-fiber network 100 includes a space-based or aerial based entangled photon source node, such as entangle particle node 106. The entangled photon source node may be attached to, or included in, a satellite, such as a geosynchronous satellite, a low earth orbit (LEO) satellite, an aircraft, a drone, a balloon, or other aerial platform. The hybrid space-fiber network may also include a communications hub, such as communications hub 104. In some embodiments, the communications hub may be located proximate to an optical ground station, such as optical ground station 126. For example, in some embodiments, optical ground station 126 may be located at a same facility as a building that houses communications hub 104. Though in some embodiments, optical ground station 126 and communications hub 104 may be connected via a length of fiber optical cable. For example, the communications hub and optical ground station may be located adjacent to each other or may be located in close proximity to one another, such as across the street, or the communications hub may be on a lower floor of a building, while the optical ground station is located on a roof of the building, etc. Additionally, hybrid space-fiber quantum network 100 includes a fiber optic network portion, such as fiber optic network 102 that comprises fiber links 116.

In some embodiments, a communications hub of a hybrid space-fiber quantum network, such as communications hub 104, may include one or more optical switches, such as optical switches 108 and 112, a quantum memory device, such as quantum memory 110, and one or more computing devices, such as computing device 114. In some embodiments, the one or more computing devices may be provided as virtual machines of a computing service of a service provider network associated with communications hub 104. In some embodiments, quantum memory 110 may be located proximate to communications hub 104, but may not necessarily be located in a same building with communications hub 104. Though in some embodiments, optical switches 108 and 112, quantum memory 110 and computing device 114 may be located in a same building or facility hosting communications hub 104. As mentioned above, the optical ground station 126 may be adjacent to the building or co-located at the facility hosting communications hub 104.

In some embodiments, fiber optic network 102 may be an existing telecommunications fiber optic network that provides last mile connectivity to customers of the telecommunications fiber optic network. While not shown, in some embodiments, quantum repeaters and/or entangled photon source nodes may be included in fiber links 116 of fiber optic network 120 to increase a working range of the fiber links 116. In some embodiments, any number of fiber links 116 may be connected to communications hub 104. For example, FIG. 1A shows three customer endpoints 118, 120, and 122 connected to communications hub 104 via fiber links 116. Though in some embodiments, more endpoints, such as 50, 100, 500, etc. may be connected to communications hub 104 via fiber links 116. In some embodiments, intermediate nodes may provide entanglement routing to customer endpoints via sets of fiber links and intermediate nodes that provide a path to a given customer endpoint.

In some embodiments, an entangled photon source node of a hybrid space-fiber quantum network, such as entangled particle source node 106 of hybrid space-fiber quantum network 100, provides respective photons of a pair of entangled photons to respective optical ground stations across which quantum entanglement is to be extended. For example, entangled particle source node 106 provides a first photon of an entangled pair to optical ground station 126 via free-space or atmospheric communication channel 124. The entangled particle source node 106 also provides a second photon of the entangled pair to optical ground station 128 which is connected to recipient node 132. As further discussed in FIGS. 2, 5, and 6, various configurations may be employed to connect recipient endpoint 132 to optical ground station 128.

Optical ground station 126 may route the received photon to optical switch 108, which may be aligned to receive a photon from optical ground station 126. The photon may be stored in quantum memory 110. In some embodiments, quantum memory 110 may include a heralding measurement device that provides a heralding signal when a photon is received at the quantum memory device 110. In response to such a heralding signal, optical switch 108 may be transitioned in alignment to next be aligned to receive a photon from fiber optic network 102. In some embodiments, computing device 114 may receive the heralding signal and may cause optical switch 108 to adjust alignment to next look to receive a photon from fiber optic network 102. In some embodiments, computing device 114 may also receive a routing request that indicates a given one of the customers of the hybrid space-fiber quantum network is requesting to have quantum entanglement distributed to an endpoint of the given customer. For example, computing device 114 may receive an indication that a given one of customers 1 (118), 2 (120), or 3 (122) have requested distributed quantum entanglement. For example, if customer 1 (118) has requested distributed quantum entanglement to recipient node 132, computing device 114 may cause optical switch 112 to be aligned to receive a photon from customer 1 via a given one of the fiber links 116 that connects communications hub 104 to customer 1 endpoint 118. Thus, when optical switch 108 is aligned to receive a photon from fiber optic network 102, optical switch 112 may be aligned such that a photon from customer 1 endpoint 118 is routed to optical switch 108 via optical switch 112. Upon arrival of the photon from customer 1 endpoint 118, quantum memory 110 may issue a second heralding signal announcing the arrival of the second photon. Quantum memory 110 may further store the second photon in the quantum memory device. In some embodiments, upon receiving the second heralding signal indicating the arrival of the photon from customer 1 endpoint 118, computing device 114 may cause a set of joint measurements to be performed on the first and second stored particles. For example, joint measurements as further described in FIG. 7 may be performed. These joint measurements may extend the quantum entanglement across the communication hub 105 such that quantum entanglement is distributed from customer 1 endpoint 118 to recipient endpoint 132. In some embodiments, the results of these joint measurements and/or measurement basis (e.g., results 130) may be communicated to the endpoints to which quantum entanglement is to be distributed, such as customer 1 endpoint 118 and recipient endpoint 132.

Figure 1B:
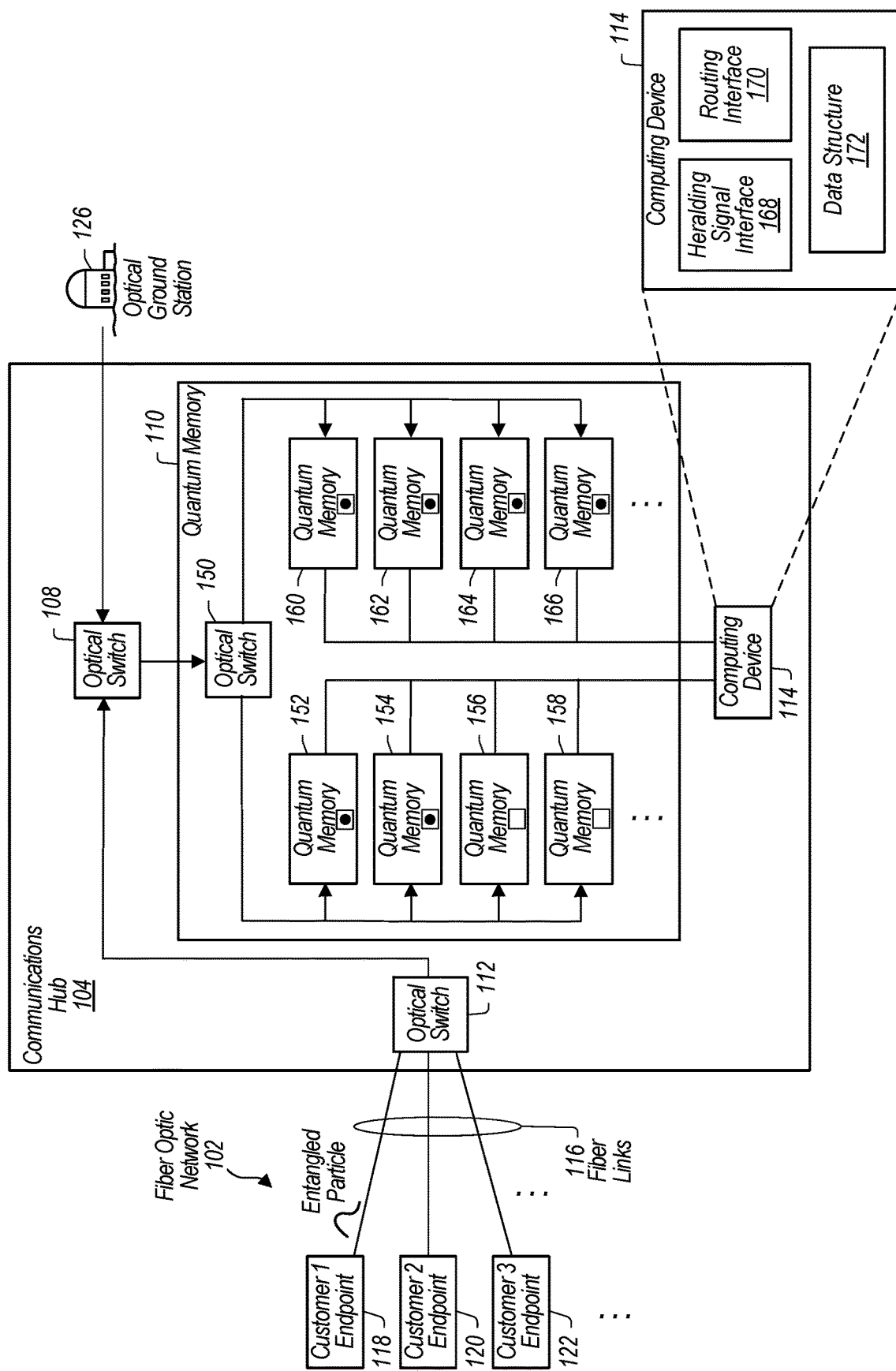
FIG. 1B illustrates a plurality of quantum memory devices located proximate to the communications hub, according to some embodiments.

FIG. 1B illustrates a plurality of quantum memory devices located proximate to the communications hub, according to some embodiments.

In some embodiments, quantum memory 110 may include one or more optical switches, such as optical switch 150, that route a given photon to a given one of the plurality of quantum memory devices via fiber optic links. Quantum memory 110 may also include a plurality of quantum memory devices that receive photons from fiber optic network 102, such as quantum memories 152, 154, 156, and 158, and from the optical ground station 126, such as quantum memories 160, 162, 164, and 166. In some embodiments, some of the plurality of quantum memory devices may store a received photon, such as quantum memories 152, 154, 160, 162, 164, and 166, while some of the plurality of quantum memory devices may remain ready to receive a photon for storage, such as quantum memories 156 and 158.

In some embodiments, computing device 114 may include an interface to receive heralding signals from quantum memory 110, such as heralding signal interface 168, an interface for routing a given photon to a given quantum memory storage location, such as routing interface 170, and one or more data structures, such as data structure 172.

In some embodiments, various optical switch configurations may be used. For example, while FIG. 1B shows three optical switches (e.g., optical switches 108, 112, and 150), in some embodiments more or fewer optical switches may be used to route received photons to respective ones of quantum memories 152, 154, 156, 158, 160, 162, 164, and 166. Also, while FIG. 1B shows quantum memories being organized based on which channel the photons are received from (e.g. optical or atmospheric/free-space), in some embodiments, photons from either source channel may be stored in any of the quantum memories 152, 154, 156, 158, 160, 162, 164, and 166.

In some embodiments, heralding interface 168 of computing device 114 is configured to receive heralding signals from quantum memories 152, 154, 156, 158, 160, 162, 164, and 166, wherein the heralding signals indicate arrival of a photon. Additionally, routing interface 170 is configured to control optical switches 108, 112, and 150 to route photons to various ones of the quantum memories 152, 154, 156, 158, 160, 162, 164, and 166. Additionally, routing interface 170 may receive routing information from a quantum entanglement distribution service indicating which ones of customers 1, 2, or 3 have requested distributed quantum entanglement. Thus, routing interface 170 may control optical switch 112 to route a received photon from a given one of customers 1, 2, or 3 based on the customer issuing a request for distributed quantum entanglement. In some embodiments, data structure 172 stores information indicating which ones of quantum memories 152, 154, 156, 158, 160, 162, 164, and 166 store received photons. Additionally, data structure 172 may store information indicating from which party respective stored photons were received. For example, data structure 172 may store information indicating that a photon stored in quantum memory 152 was received from customer 1 who is associated with endpoint 118. Additionally, data structure 172 may store information indicating a photon stored in quantum memory 160 was received via optical ground station 126. Thus, in response to a request for distributed quantum entanglement from customer 1, computing device 114 may identify quantum memories 152 and 160 as storing photons that can be used to provide the requested distributed quantum entanglement to customer 1. This may be performed based on information stored in data structure 172. In some embodiments, the information stored in data structure 172 may be organized as a database indicating whether or not respective ones of quantum memories 152, 154, 156, 158, 160, 162, 164, and 166 stored received photons, and for the ones storing received, the database may further indicate which party the received photons are associated with (e.g. customers 1, 2, 3, or optical ground station 126).

In some embodiments, entangled particle source node 106 (shown in FIG. 1A) may repeatedly or continuously provide photons to communications hub 104 via optical ground station 126. The received photons may be stored in a bank of quantum memories, such as quantum memories 160, 162, 164, and 166. Thus, in some embodiments, respective ones of quantum memories 160, 162, 164, and 166 may be pre-populated with received photons such that a pre-stored photon is ready to be used to distribute quantum entanglement upon receipt of a photon from a given one of customers 1, 2, or 3 that are requesting quantum entanglement distribution.

Figure 2:
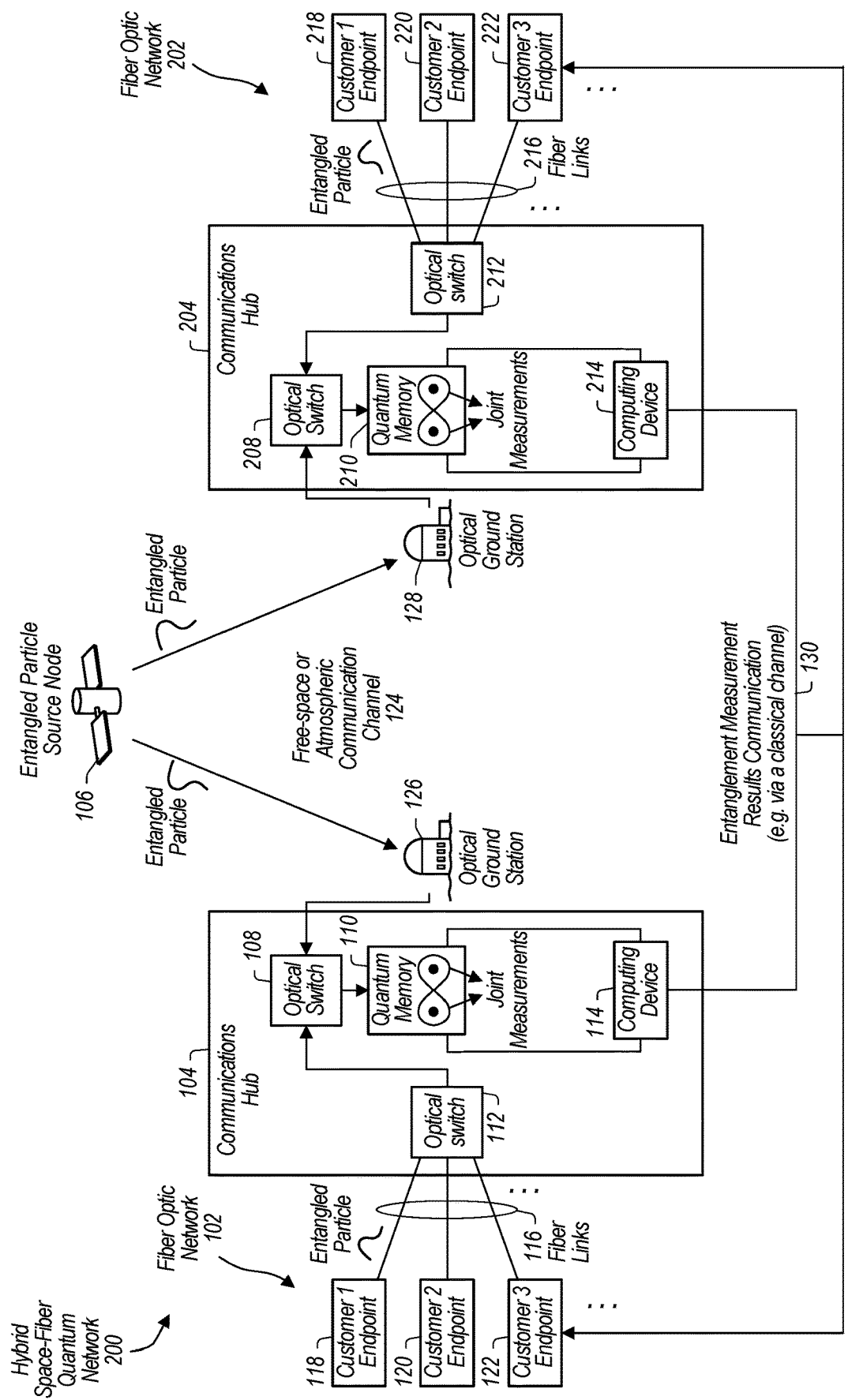
FIG. 2 illustrates another example hybrid space-fiber quantum network that includes multiple optical ground stations and associated communications hubs proximate to the optical ground stations, wherein the hybrid space-fiber quantum network enables quantum entanglement distribution amongst any of respective pluralities of fiber optic links connected to the respective communications hubs, according to some embodiments.

FIG. 2 illustrates another example hybrid space-fiber quantum network that includes multiple optical ground stations and associated communications hubs proximate to the optical ground stations, wherein the hybrid space-fiber quantum network enables quantum entanglement distribution amongst any of respective pluralities of fiber optic links connected to the respective communications hubs, according to some embodiments.

For example, hybrid space-fiber quantum network 200 includes similar components as hybrid space-fiber quantum network 100 illustrated in FIG. 1A, but additionally includes a second communications hub 204 located proximate to optical ground station 128. Communications hub 204 includes optical switch 208 configured to direct a photon received from optical ground station 128 into quantum memory 210 or alternatively direct a photon received from fiber optic network 202 into quantum memory 210. Additionally, communications hub 204 includes optical switch 212 that is configured to select a given one of the fiber links 216 that is to be aligned with optical switch 208 to direct a photon received from any one of customer endpoints 218, 220, or 222 into quantum memory 210 via optical switch 208. In a similar manner as quantum memory 110, quantum memory 210 may issue heralding signals upon receipt of a photon. The heralding signals may be received by computing device 214, which may cause optical switch 208 to be adjusted such that the optical switch 208 is aligned to direct a next received photon into quantum memory 210. Also, upon receipt of a second heralding signal for a set of photons that are to be entangled at communications hub 204, computing device 214 may cause joint measurements of the photons to be performed to effectuate the entangling. The results of the joint measurements and related measurement basis information (e.g., measurement results 130) may be communicated to the endpoints to which quantum entanglement is to be distributed via a classical communications channel, such as the internet.

In some embodiments, first and second communications hubs of a hybrid space-fiber network, such as communications hubs 104 and 204 of hybrid space-fiber quantum network 200, may enable any of a group of endpoints connected to the first communications hub to share distributed quantum entanglement within any of a group of endpoints connected to the second communications hub. For example, any of customer endpoints 118, 120, and 122 may share distributed quantum entanglement with any of customer endpoints 218, 220, and 222, which are connected via hybrid space-fiber quantum network 200. While hybrid space-fiber quantum network 200 illustrates two communications hubs for the sake of simplicity of illustration, in some embodiments, a hybrid space-fiber network may include any number of communication hubs, connected to any number of fiber links. In some embodiments, a hybrid space-fiber network may be organized using a hub and spoke topography with the communication hubs acting as hubs and the fiber links connected to the communications hubs acting as spokes. In some embodiments, some "spokes" may connect to other smaller hubs. For example, in some embodiments, smaller intermediate nodes comprising quantum repeaters may connect to multiple fiber links, and the quantum repeaters may in turn be connected via a fiber link to a communications hub, such as communications hub 104 or 204.

Figure 3:
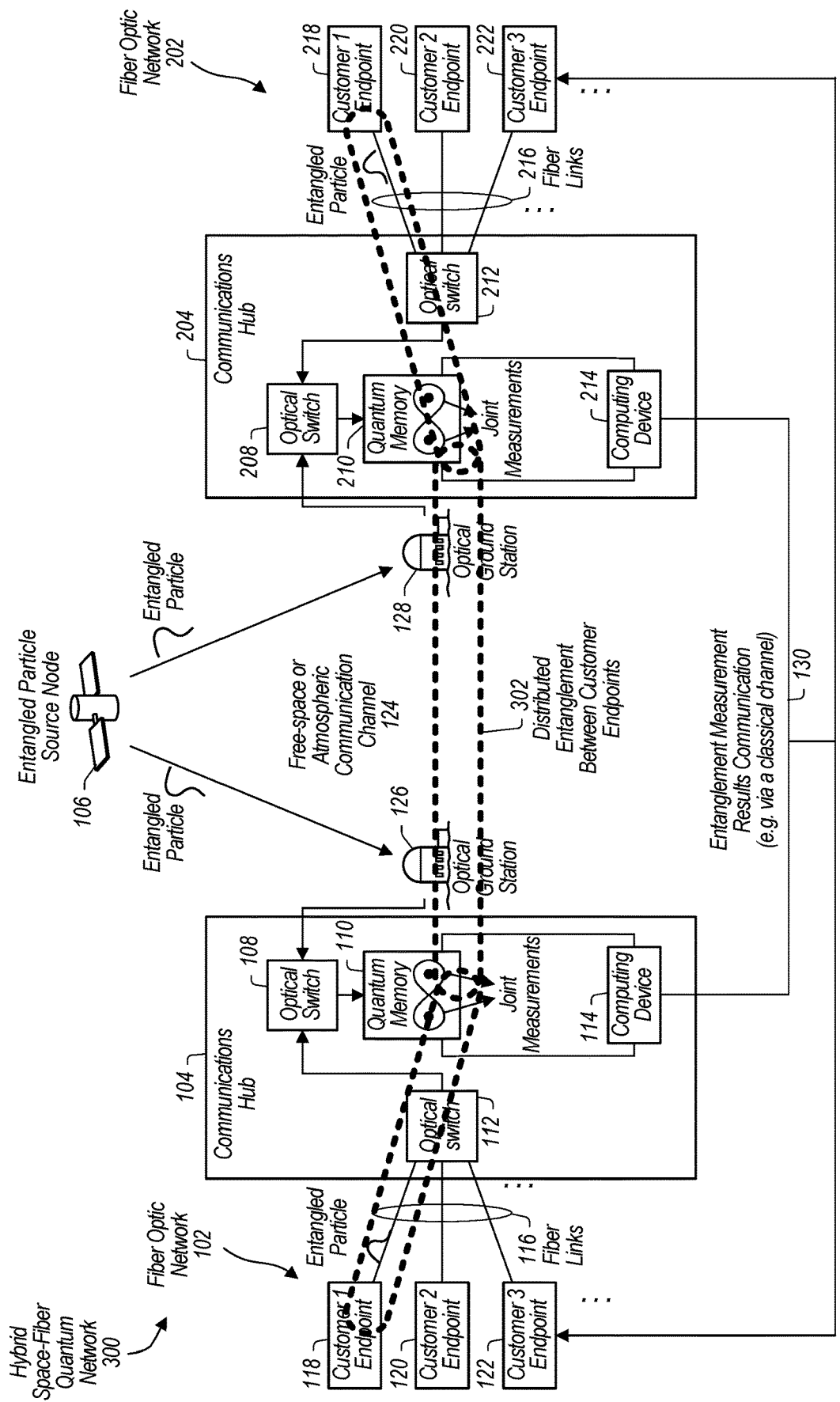
FIG. 3 illustrates quantum entanglement being distributed between a set of customer endpoints via a hybrid space-fiber quantum network, according to some embodiments.

FIG. 3 illustrates quantum entanglement being distributed between a set of customer endpoints via a hybrid space-fiber quantum network, according to some embodiments.

Hybrid space-fiber network 300 includes similar components as hybrid space-fiber network 200 illustrated in FIG. 2 and shows distributed entanglement 302 being distributed between endpoints of a same customer, such as customer 1 endpoint 118 and customer 1 endpoint 218. As an example, customer 1 may operate in different continents or at different geographic locations within a same continent, such as on different coasts of the United States. In some embodiments, such a customer may utilize a distributed entanglement service that operates using a hybrid space-fiber network to distribute entanglement between the customer's facilities using both optical links, such as fiber links 116 and 216, and free-space or atmospheric links, such as free-space or atmospheric communication channel 124. In some embodiments, a customer, such as customer 1, may simply provide a request for distributed entanglement to a quantum entanglement distribution service that operates hybrid space-fiber quantum network 300 and the quantum entanglement distribution service may cause optical switches 112 and 212 to be aligned to distribute entanglement between the customer endpoints.

In some embodiments, entangled particle source node 106 may be repeatedly sending entangled particles to optical ground stations 126 and 128. These entangled particles may be stored in quantum memories 110 and 210. Thus, when a photon arrives at quantum memory 110 from customer endpoint 118, the photon may be entangled with a prior arriving photon from entangled particle source node 106. A similar process may take place at quantum memory 210. In some embodiments, free-space or atmospheric communication channel 124 may be used to simultaneously distribute quantum entanglement between multiple sets of customer endpoints. For example, in some embodiments, quantum entanglement may be distributed between multiple sets of endpoints 118, 120, and 122 that are coupled with endpoints 218, 220, and 222. In some embodiments, quantum memories 110 and 210 may entangle asynchronously received photons.

Figure 4:
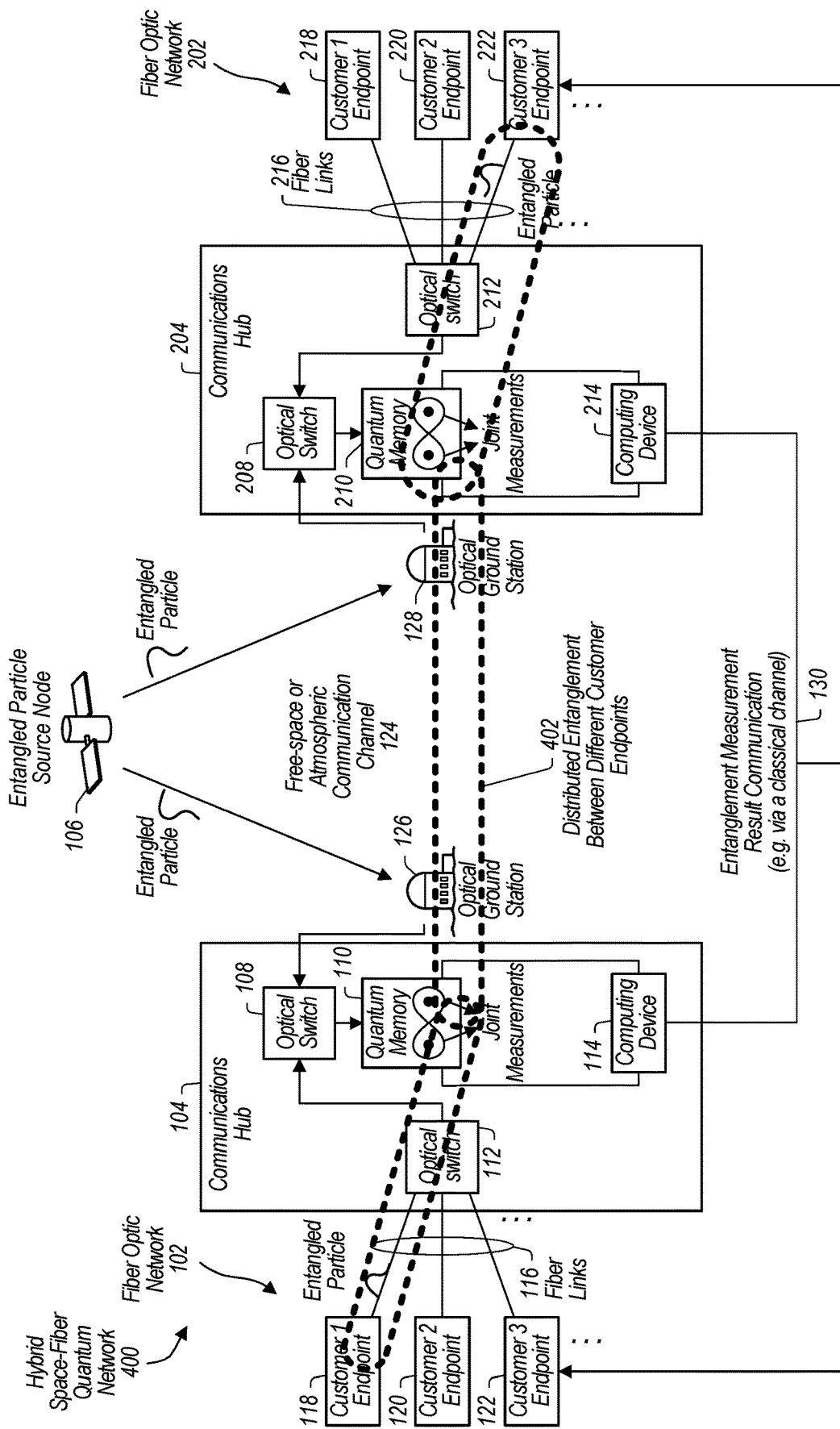
FIG. 4 illustrates quantum entanglement being distribution between endpoints of different customers via a hybrid space-fiber quantum network, according to some embodiments.

FIG. 4 illustrates quantum entanglement being distribution between endpoints of different customers via a hybrid space-fiber quantum network, according to some embodiments.

In a similar manner as shown in FIG. 3, in FIG. 4 hybrid space-fiber quantum network 400 illustrates distributed quantum entanglement 402 being distributed between customer 1 endpoint 118 and customer 3 endpoint 222. For example, in some embodiments, a first one of customer 1 and customer 3 may submit a request to distribute quantum entanglement between endpoints of customer 1 and 3 to a quantum entanglement distribution service. The service may ask the other one of customer 1 and customer 3 to provide acceptance with regard to the distributed quantum entanglement. In response to receiving the request and approval from the other party, the quantum entanglement distribution service may then cause computing devices 114 and 214 to operate optical switches 112 and 212 to cause the quantum entanglement to be distributed between the endpoints of the different customers via the hybrid space-fiber quantum network 400.

Figure 5:
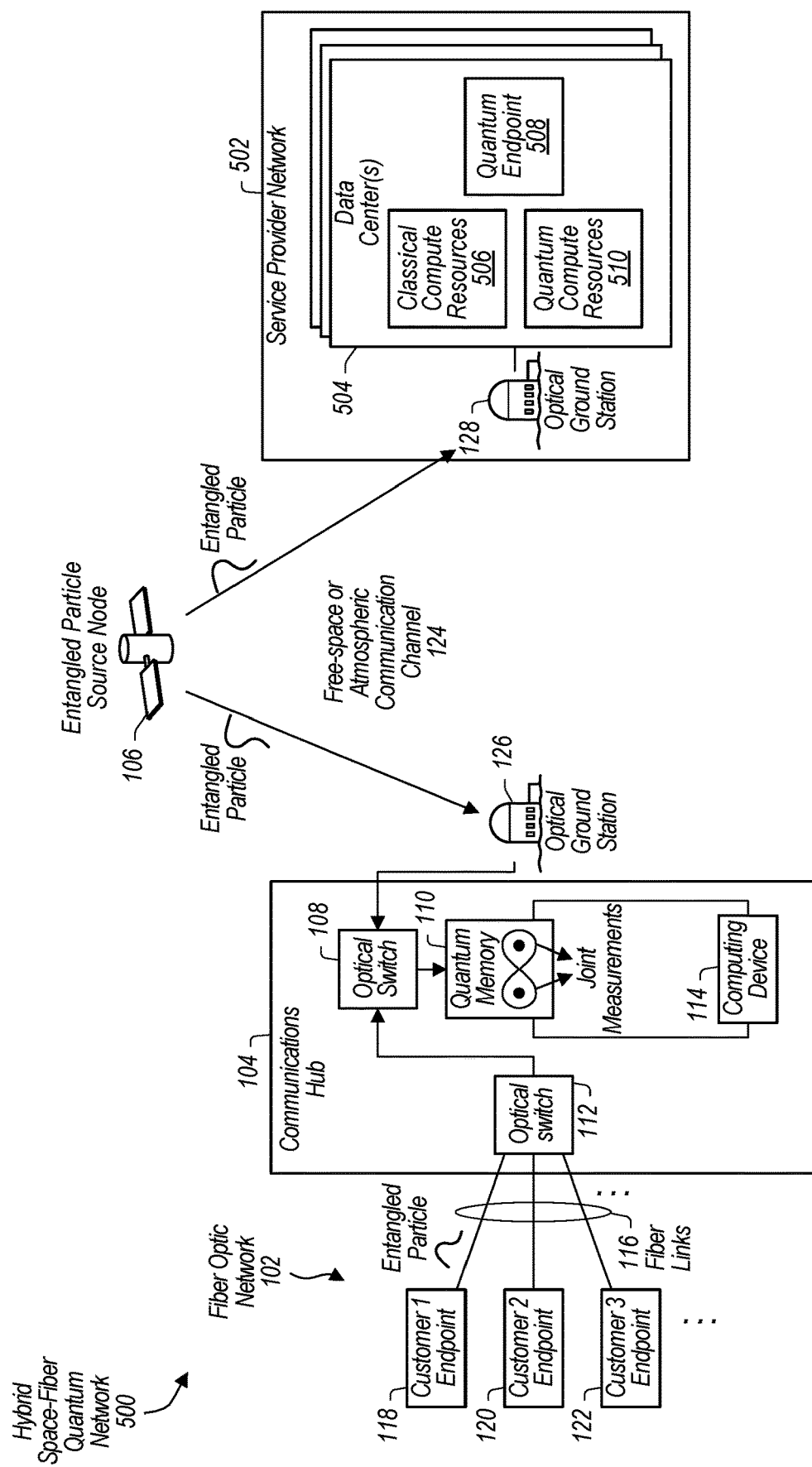
FIG. 5 illustrates another example hybrid space-fiber quantum network that connects customers to resources of a provider network via distributed quantum entanglement, according to some embodiments.

FIG. 5 illustrates another example hybrid space-fiber quantum network that connects customers to resources of a provider network via distributed quantum entanglement, according to some embodiments.

In some embodiments, a hybrid space-fiber quantum network may enable customers to connect to service provider services using distributed quantum entanglement, where the customers are located geographically distant form the service provider network. For example, hybrid space-fiber quantum network 500 includes a communications hub 104, entangled particle source node 106 and optical ground stations 126 and 128 as previously illustrated in FIG. 1A. However, recipient endpoint 132 may be a quantum endpoint 508 included in service provider network 502, such as at a data center 504. The quantum endpoint 508 may be included in a data center 504 located proximate to optical ground station 128. In some embodiments, data centers 504 of service provider network 502 may host classical computing resources 506 and quantum computing resource 510, which may be used to provide various types of data storage and/or computing services to customers of the service provider network 502. In some embodiments, customers of service provider network 502, such as customers 1, 2, and 3 may receive distributed quantum entanglement that connects the customer endpoints (e.g., 118, 120, 122, etc.) to the service provider network 502. The customers may then use this distributed quantum entanglement to privately and securely transmit and receive data between the customer endpoints (e.g. 118, 120, 122, etc.) and the classical or quantum computing resources (e.g., classical computing resources 506 and quantum computing resources 510) of the service provider network 502.

Figure 6:
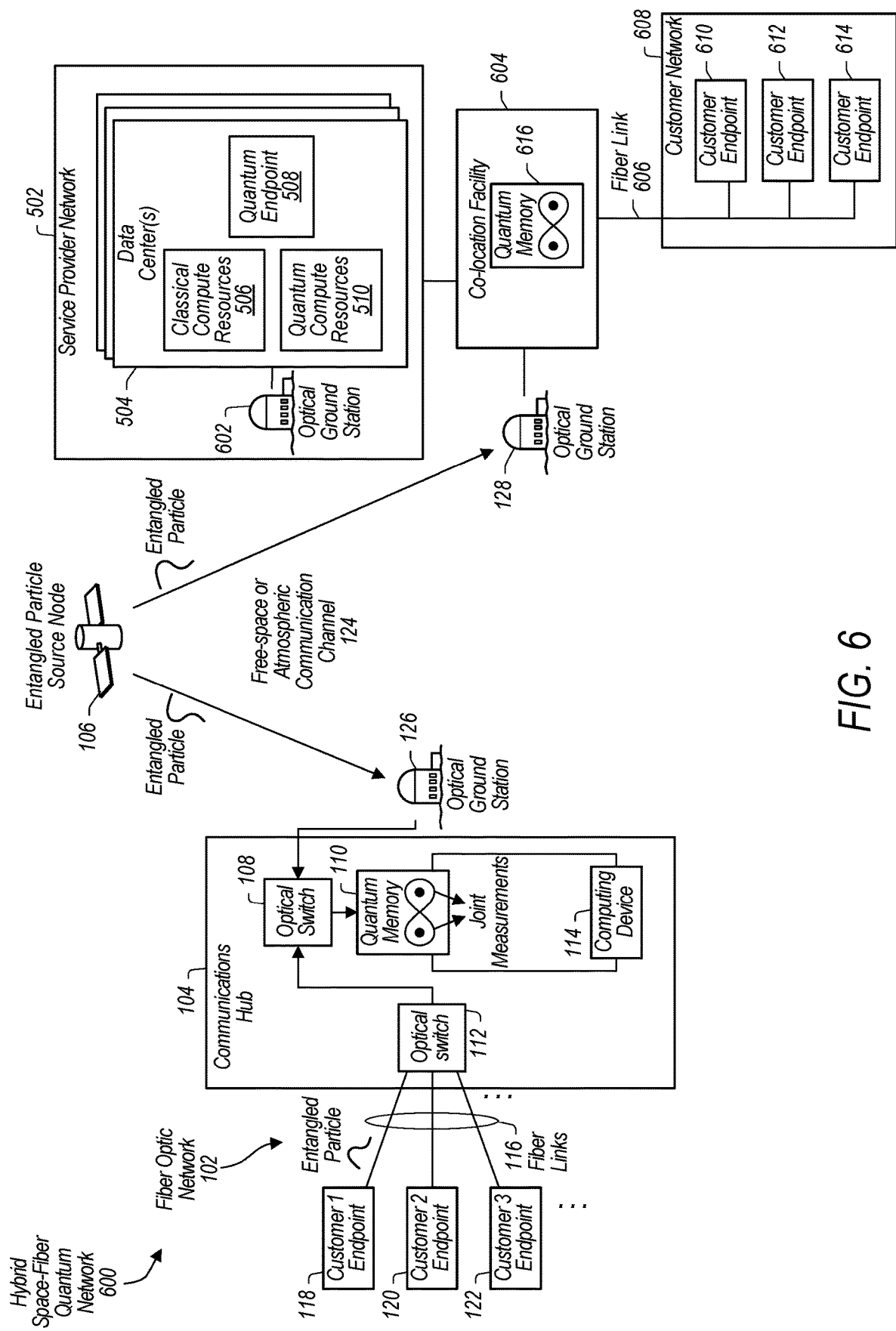
FIG. 6 illustrates yet another example hybrid space-fiber quantum network that includes an optical ground station at a co-location facility, according to some embodiments.

FIG. 6 illustrates yet another example hybrid space-fiber quantum network that includes an optical ground station at a co-location facility, according to some embodiments.

In some embodiments, instead of locating optical ground station 128 proximate to a data center 504, the optical ground station may be located at a co-location facility connected to a service provider network. For example, hybrid space-fiber quantum network 600 includes optical ground station 128 located proximate to co-location facility 604. The co-location facility 604 may be operated by a $3^{rd}$ party that provides a location for network connections between customer network 608 and service provider network 504. As shown in FIG. 6, in some embodiments service provider network 502 may additionally include other optical ground stations 602 located proximate to data centers 504. In some embodiments, co-location facility 604 may host service provider network 502 routers and routers for customer network 608 that are connected to the co-location facility 604 via fiber links 606. Thus, customer endpoints 610, 612, 614 may be connected to co-location facility 604 as are classical compute resources 506 and quantum compute resources 510 of data centers 504 of service provider network 502. In some embodiments co-location facility 604 may further comprise a quantum repeater that includes a quantum memory device such as quantum memory 610. In some embodiments, co-location facility 604 may enable customers, such as customer 608, to share a common optical ground station with other customers, such as optical ground station 128.

Figure 7:
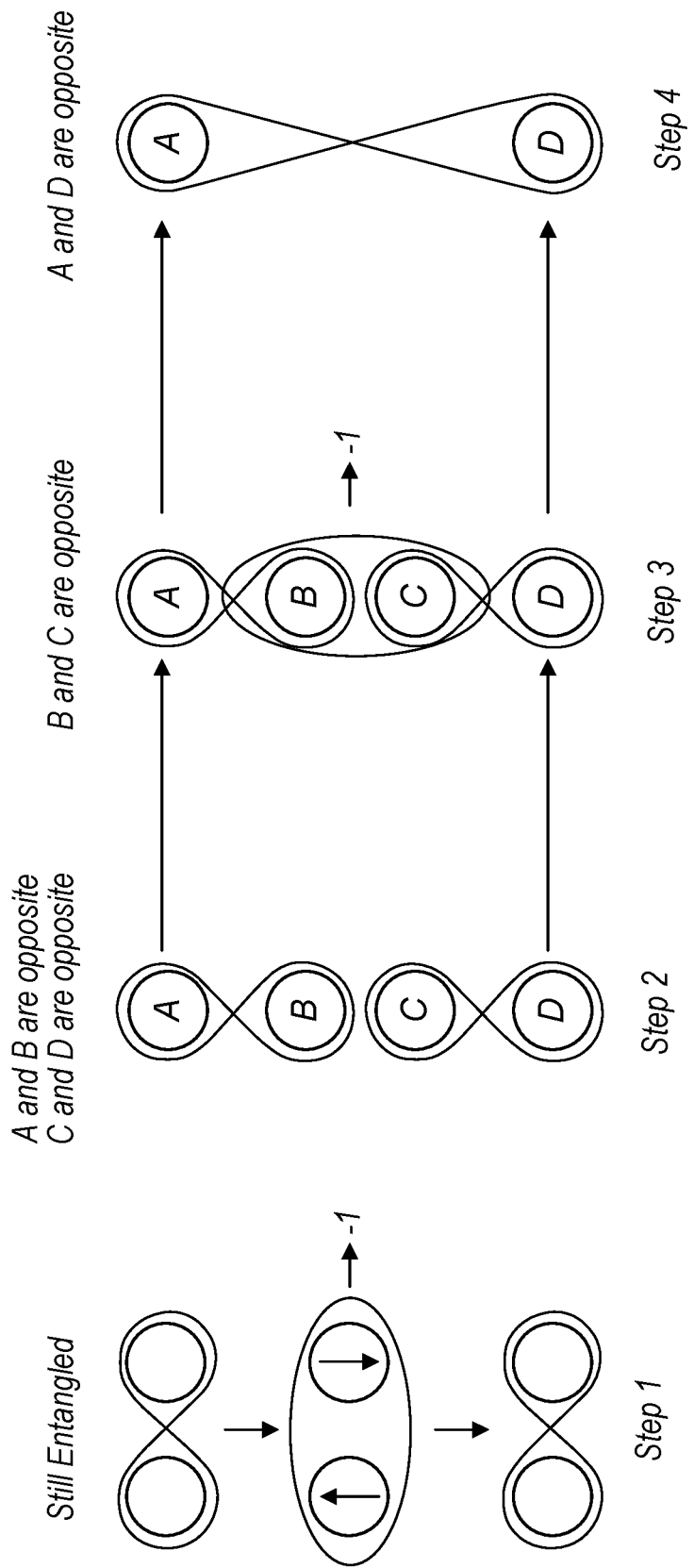
FIG. 7 is an example diagram illustrating how entanglement is extended by performing joint measurements of received particles of respective sets of entangled particles distributed via fiber optic or free-space/atmospheric network links, according to some embodiments.

FIG. 7 is an example diagram illustrating how entanglement is extended by performing joint measurements of received particles of respective sets of entangled particles distributed via fiber optic or free-space/atmospheric network links, according to some embodiments.

For example, at step 1, a joint measurement is performed that measures two particles (e.g., photons) in such a way as that the joint measurement only determines if the two particles are the same or opposite. This is done without revealing more information about the individual particles. Then, at step 2, the entangled pairs are defined by their correlations, e.g., opposite or the same. In the example shown in FIG. 7 both A/B and C/D are entangled such that they are opposites. Next, at step 3 a joint measurement is performed on B/C with an outcome (e.g., opposite or same), which is opposite in the example case shown in FIG. 7. This tells A that its compliment is the opposite D's compliment, allowing A and D to infer they are opposites. Then, using this information at step 4 A/D are now entangled such that they are always in the opposite state. In some embodiments, the joint measurements may be performed using a local two-qubit gate between B and C (e.g., a CNOT gate) and may further include measuring each bit individually. This can be understood as an entangling operation and a measurement, or conversely as a single measurement in an "entangled basis." When the joint measurements are performed in this way, the results reveal information about the correlations between particles, such as particles B and C, but not information about the particles themselves. This is due to the entanglement generated by the two-qubit operation.

Figure 8:
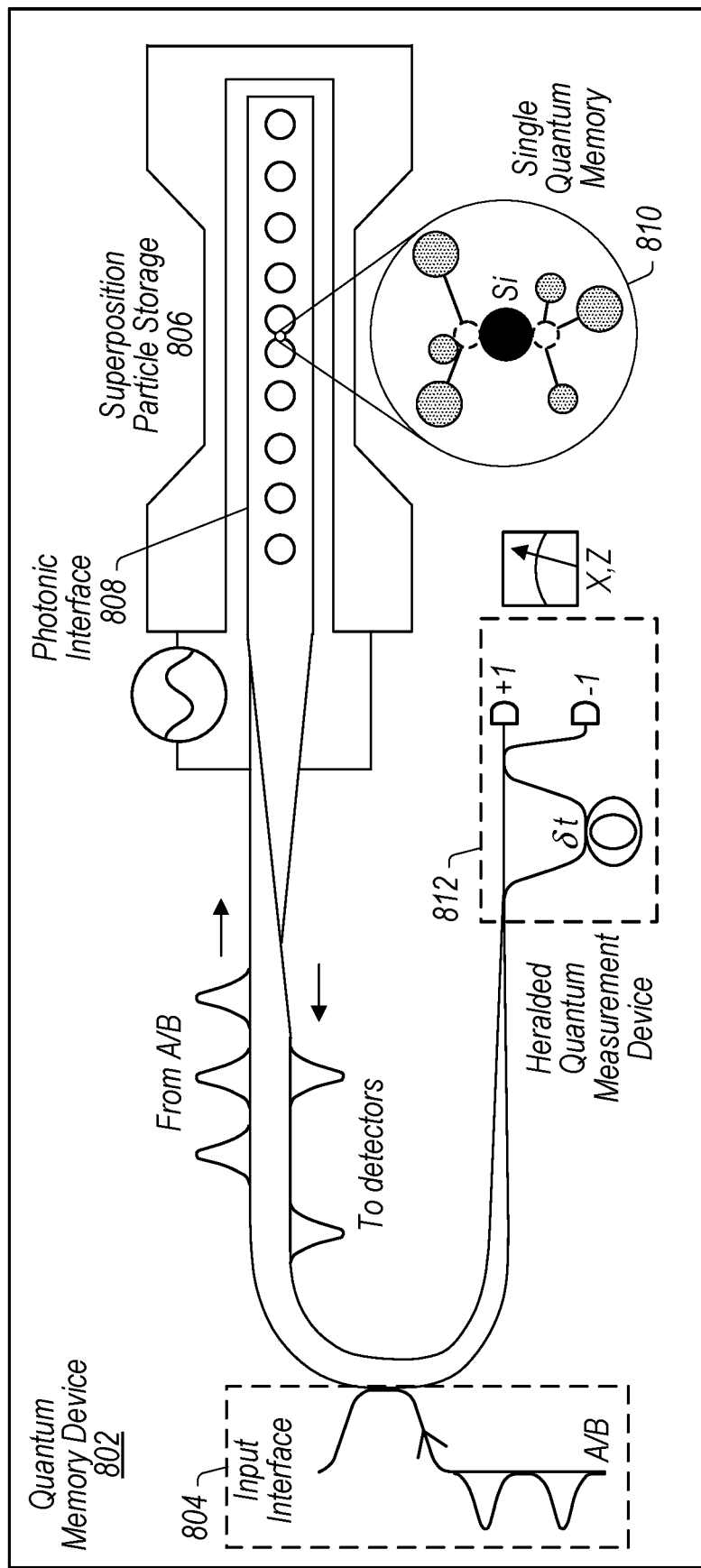
FIG. 8 illustrates an example quantum memory that may be included in one or more nodes of a hybrid space-fiber quantum network, according to some embodiments.

FIG. 8 illustrates an example quantum memory that may be included in an intermediate node, according to some embodiments.

In some embodiments, quantum memories 110, 210, and 610 as described in FIGS. 1A-6 may include similar arrangements as quantum memory 802 illustrated in FIG. 8. Though in some embodiments, other quantum memory configurations may be used. Quantum memory 802 includes in input interface 804 that receives particles in a superposition state, superposition particle storage 806, which may, in some embodiments, include a photonic interface 808 comprising single quantum memory 810, and heralded quantum measurement device 812. For example, single quantum memory 810 illustrates a silicon vacancy in diamond structure. Though in some embodiments, other structures such as: nitrogen-vacancy in diamond, trapped atoms, ensemble doped crystals, atomic vapors, silicon carbide emitters, single rare earth dopants, trapped ions, superconducting qubits, quantum dots in gallium arsenide, etc. may be used. Furthermore, input interface 804 illustrates an embodiment of a time-bin qubit encoding conversion module, however other embodiments with other input interface configurations may be used, including wavelength or mode matching.

In some embodiments, quantum memory 802 may be configured to store a first received entangled particle of a first pair of entangled particles in a first single quantum memory 810 of photonic interface 808 of superposition particle storage 806 and also store a second received entangled particle of a second pair of entangled particles in a second single quantum memory 810 of photonic interface 808 of superposition particle storage 806. The quantum memory 802 may further be configured to perform one or more joint measurements on the first and second particles via heralded quantum measurement device 812 without collapsing superposition states of the first and second entangled particles. The joint measurements may determine a correlation relationship between the superposition states of the entangled particles such that entanglement can be extended between the pairs of entangle particles.

The quantum memory 802 may be heralded, meaning that when a particle arrives and is stored in a single quantum bit 810, the quantum measurement device 812 (or other device of the quantum memory 802) issues a heralding signal announcing the arrival of the particle. In some embodiments, such a heralding signal may be used to operate an optical switch to align the switch such that the quantum memory receives a next particle from an entangled particle source with which quantum entanglement is to be distributed. Furthermore, when the second particle arrives at the quantum memory 802 from the entangled particle source, a second heralding signal may be issued. The second heralding signal may then cause joint measurements to be performed on the first and second particles stored in the quantum memory 802. Furthermore, the joint measurements may extend the entanglement. In some embodiments, quantum measurement device 812 may perform heralding measurements and joint measurements, or in some embodiments, different quantum measurements devices 812 may be used to perform heralding measurements and joint measurements on received particle pairs. In some embodiments, the heralding function may be performed by a quantum non-destruction measuring device that can detect a particle (e.g., photon) entering the quantum memory 802 without causing the particle to be collapsed out of the superposition state.

In some embodiments, quantum memory 802 may further include a conversion interface. For example, in some embodiments, the conversion interface may convert a transmission frequency of a received particle to a different frequency. For example, in some embodiments, fiber optic links may transmit particles using different frequency wavelengths and such variations may be adjusted via a conversion interface of quantum memory 802. In some embodiments, the conversion interface may be located proximate to the quantum memory device 802, but may not necessarily be included in the quantum memory device 802. As another example, particles received at a communications hub via optical ground stations, such as optical ground stations 126 and 128 illustrated in FIGS. 1A-6, and particles received at the communications hub via fiber links may be transmitted at different wavelengths and a conversion interface of the communications hub may convert the wavelength of the received particles to a wavelength used by quantum memory device 812 to store quantum particles.

In some embodiments, quantum memory 802 (or sets of quantum memories) may store redundant sets of particles for use in generating quantum entanglement that is to be distributed. In such embodiments, the quantum memor(ies) may perform error correction by comparing joint measurement results for multiple sets of particles. Such error correction may function as entanglement purification, in some embodiments. Also, parties at the endpoints connected via the redundantly distributed quantum entanglement may perform error correction.

In some embodiments, a communications hub may include (or be proximately located to) an array of quantum memory devices. In such embodiments, a computing device of the communications hub may maintain a data structure indicating in which memory locations received particles (e.g., photons) are stored. The data structure may also indicate which endpoint or intermediate nodes from which the particles (e.g., photons) were received. For example, the computing device may be configured to indicate, in response to receiving a heralding signal, a memory location at which a given photon is stored in one or more quantum memory devices associated with a communications hub. Additionally, the data structure may be used to identify photons stored in respective memory locations that are to be used to perform joint measurements to extend quantum entanglement between respective endpoints. In some embodiments, the data structure may be formatted as a database of stored photons and in response to heralding signals, the one or more computing devices of the communications hub may update the database to indicate locations of stored photons that are available to be used to distribute quantum entanglement.

Figure 9:
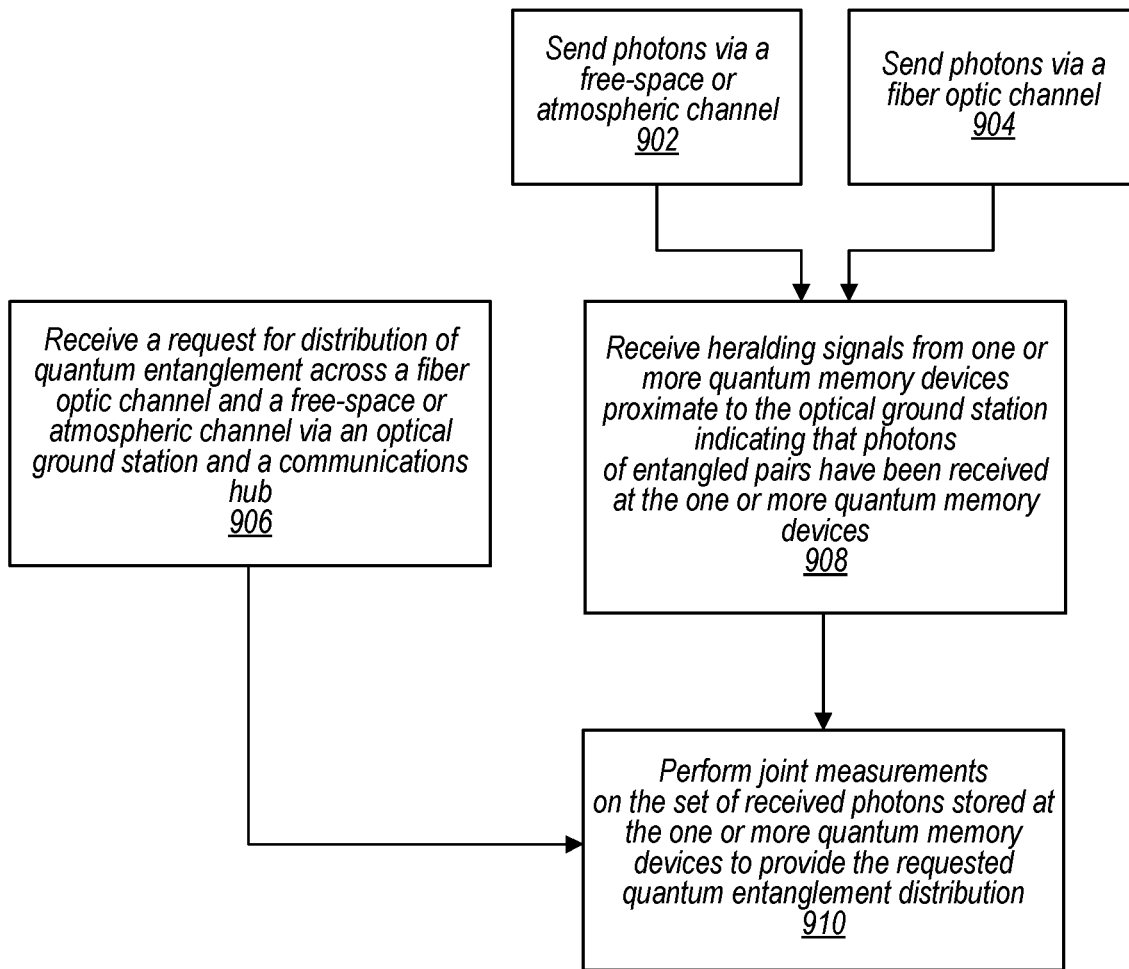
FIG. 9 is a flowchart illustrating a process of distributing quantum entanglement via a hybrid space-fiber quantum network, according to some embodiments.

FIG. 9 is a flowchart illustrating a process of distributing quantum entanglement via a hybrid space-fiber quantum network, according to some embodiments.

At block 906, a quantum entanglement distribution service and/or a hybrid space-fiber quantum network receives a request for distribution of quantum entanglement across a fiber optic channel and a free-space or atmospheric channel via an optical ground station and a communications hub. In parallel, photons are sent via a free-space or atmospheric channel in block 902 and via a fiber optic channel in block 904. At block, 908, in order to provide the requested distributed quantum entanglement a computing device of the hybrid space-fiber quantum network receives heralding signals from one or more quantum memory devices proximate to the optical ground station indicating that photons that are to be entangled have been received at the one or more quantum memory devices. Furthermore, at block 910, the computing device of the hybrid space-fiber quantum network performs joint measurements on the set of received photons stored at the one or more quantum memory devices and provides results of the joint measurements along with respective measurement basis to the endpoints or an intermediate joint measurement data collection device in order to provide the requested distributed quantum entanglement.

Figure 10:
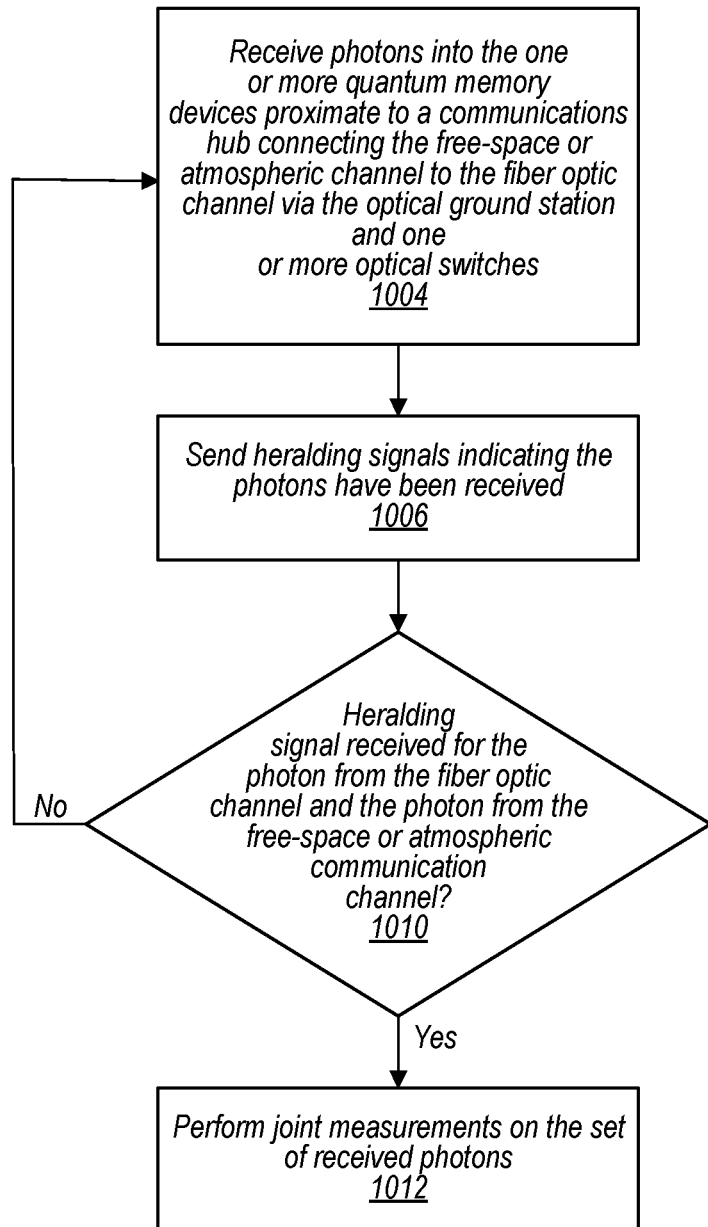
FIG. 10 is a flowchart illustrating a process of extending quantum entanglement in a hybrid space-fiber quantum network across an interface of a free-space/atmospheric channel and a fiber channel, according to some embodiments.

FIG. 10 is a flowchart illustrating a process of extending quantum entanglement in a hybrid space-fiber quantum network across an interface of a free-space/atmospheric channel and a fiber channel, according to some embodiments.

At block 1002, the distributed photons are received into one or more quantum memory devices of the hybrid space-fiber quantum network. The one or more quantum memory devices are located proximate to a communications hub connecting the free-space or atmospheric channel to the fiber optic channel via the optical ground station and one or more optical switches. At block 1004, the one or more quantum memory devices send heralding signals indicating the photons have been received. At block 1006, a computing device that performs control operations at the communications hub determines whether or not heralding signals have been received for both photons of a set of photons that are to be entangled via joint measurements, wherein one of the photons is received via the atmospheric or free-space channel and the other photon of the set to be entangled is received via a fiber optic link. At block 1008, in response to determining both photons of the set to be entangled have been received (e.g., heralding signals have been received for both photons), the computing device causes joint measurements to be performed to entangle the set of photons. In some embodiments, a computing device of the communications hub may maintain a data structure indicating in which memory locations received particles (e.g., photons) are stored. The data structure may also indicate which endpoint or intermediate nodes from which the particles (e.g., photons) were received. For example, the computing device may be configured to indicate, in response to receiving a heralding signal, a memory location at which a given photon is stored in one or more quantum memory devices associated with a communications hub. Additionally, the data structure may be used to identify photons stored in respective memory locations that are to be used to perform joint measurements to extend quantum entanglement between respective endpoints. In some embodiments, the data structure may be formatted as a database of stored photons and in response to heralding signals, the one or more computing devices of the communications hub may update the database to indicate locations of stored photons that are available to be used to distribute quantum entanglement. In some embodiments, performing the joint measurements at block 1008 may further include identifying the respective memory locations storing the photons that are to be entangled via the joint measurements.

As previously discussed, a quantum memory device of a communications hub of a hybrid space-fiber quantum network may enable asynchronously received photons to be entangled. Thus, at block 1006, if heralding signals have not been received for both photons of a set that are to be entangled, the hybrid space-fiber quantum network may revert to block 1002 and wait for a later arriving photon to be received.

Figure 11:
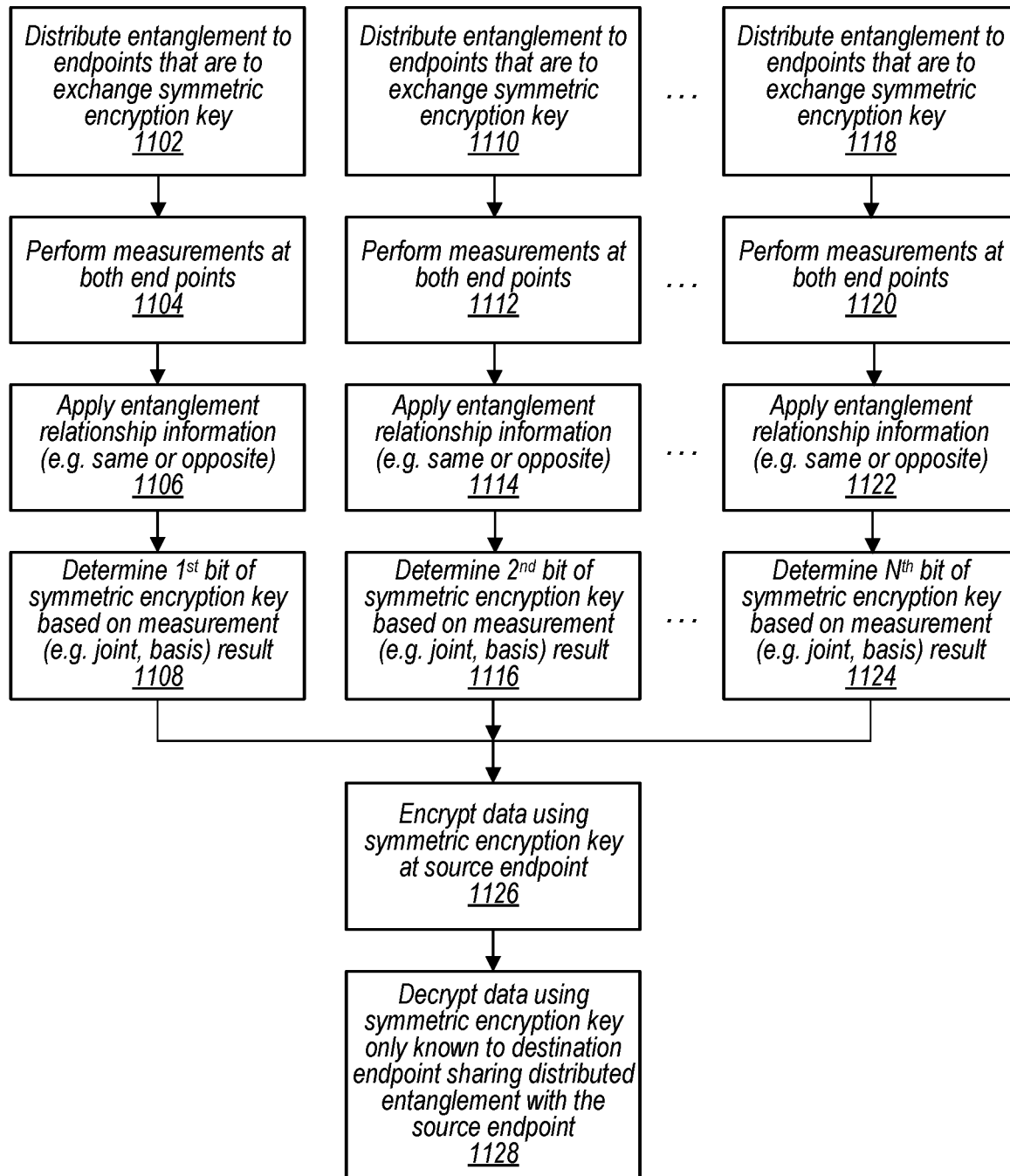
FIG. 11 is an example flow diagram for a process of distributing a symmetric encryption key using distributed quantum entanglement, according to some embodiments.

FIG. 11 is an example flow diagrams for a process of distributing a symmetric encryption key using distributed quantum entanglement, according to some embodiments.

At block 1102, entanglement is distributed between endpoints that are to communicate a symmetric encryption key. At block 1104, measurements are performed at both ends of the distributed quantum entanglement. If the particle (e.g., photon) is received at a fiber modem, the particle is measured upon receipt. Otherwise, the received quantum particle (e.g., photon) may be stored in a quantum memory at the receiving endpoint. At block 1106, the entanglement relationship information determined for the distributed entanglement is applied at one or both endpoints. Then at block 1108 a first bit of the symmetric encryption key is determined for both parties at both ends of the distributed entanglement based on the measurement result to which the entanglement relationship has been applied. This process may be repeated at blocks 1110 through 1116 to determine a second bit of the symmetric encryption key and may further be repeated any number of times, such as at blocks 1118 through 1124 to determine N bits of the symmetric encryption key.

At block 1126, data is encrypted by one of the parties using the bits of the determined symmetric encryption key and at block 1128 the data is decrypted by a second one of the parties using the bits of the determined symmetric encryption key. Because the bits of the symmetric encryption key are based on the measurements of the distributed entanglement, the bits are only known by the parties sharing the distributed entanglement. Also, if the symmetric encryption key is only used once by the respective parties, it is nearly impossible to be defeated, if sufficiently random.

Illustrative Computer System

Figure 12:
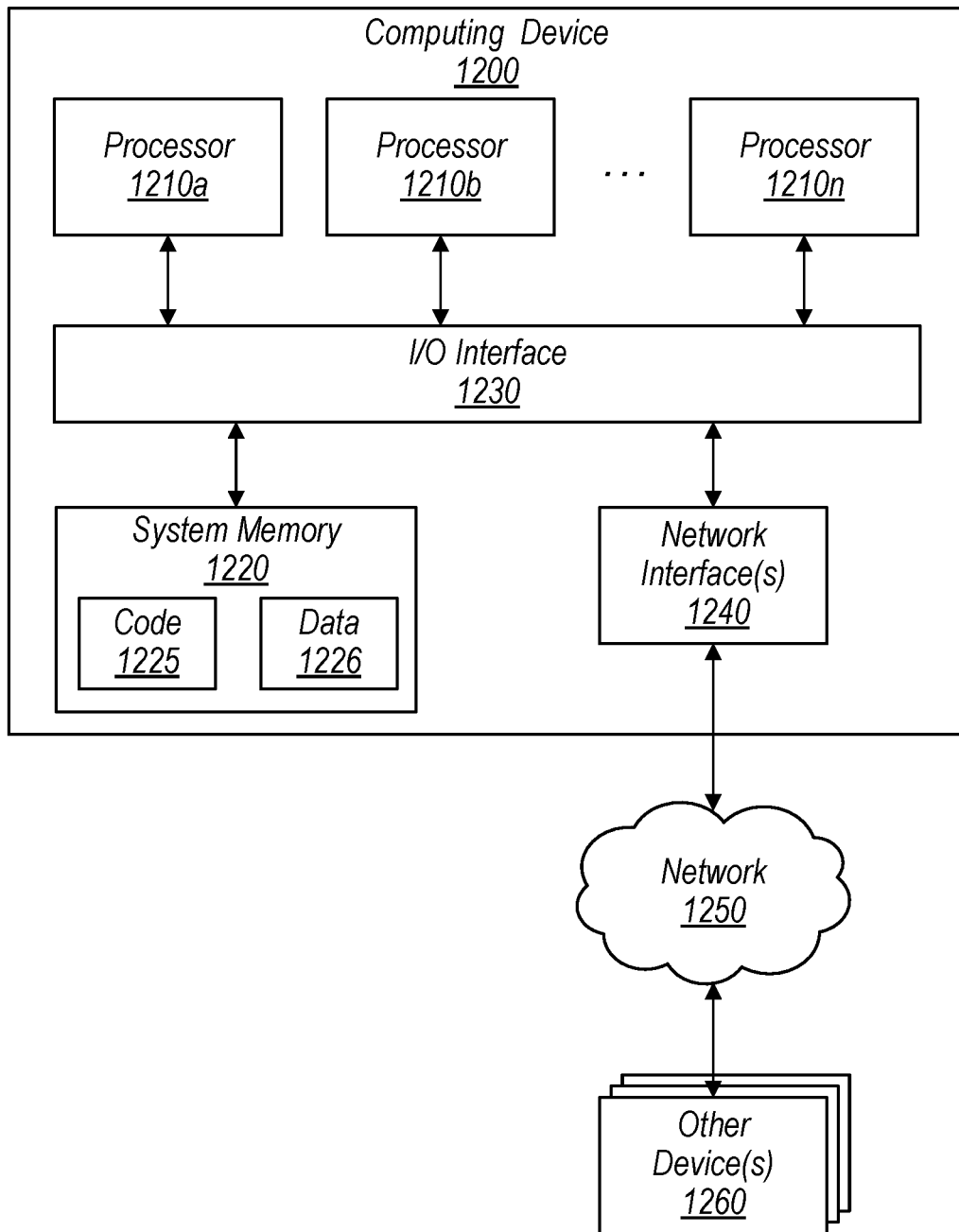
FIG. 12 is a block diagram illustrating an example computing device that may be used in at least some embodiments.

FIG. 12 illustrates such a general-purpose computing device 1200 as may be used in any of the embodiments described herein. In the illustrated embodiment, computing device 1200 includes one or more processors 1210 coupled to a system memory 1220 (which may comprise both non-volatile and volatile memory modules) via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226.

In some embodiments, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example.

Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1A through FIG. 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may represent one embodiment of a computer-accessible medium configured to store at least a subset of program instructions and data used for implementing the methods and apparatus discussed in the context of FIG. 1A through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1200 as system memory 1220 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
   a photon source configured to distribute photons in superposition states through a free-space or atmospheric communication channel;
   an optical ground station configured to receive one or more of the photons from the photon source;
   a communications hub, proximate to the optical ground station, configured to connect to a plurality of fiber optic links;
   one or more quantum memory devices proximate to the optical ground station configured to send heralding signals upon reception of one or more of the photons; and
   one or more computing devices configured to:
      receive heralding signals from the one or more quantum memory devices indicating that two photons have been received at the one or more quantum memory devices via the photon source and via a given one of the plurality of fiber optic links connected to the communications hub, respectively; and
      extend quantum entanglement from the free-space or atmospheric communication channel to the given one of the plurality of fiber optic links.

2. The system of claim 1, wherein, to extend the quantum entanglement from the free-space or atmospheric communication channel to the given one of the plurality of fiber optic links, the one or more computing devices are further configured to perform joint measurements on the two received photons.

3. The system of claim 2, wherein the one or more computing devices are further configured to:
   indicate in a data structure, in response to receiving a first heralding signal, a memory location at which a first photon of the two received photons is stored in the one or more quantum memory devices; and
   indicate in the data structure, in response to receiving a second heralding signal, a second memory location at which a second photon of the two received photons is stored in the one or more quantum memory devices,
   wherein to perform the joint measurements on the received first and second photons,
      the one or more computing devices are further configured to:
         identify memory locations at which the joint measurements are to be performed based on the location information indicated in the data structure.

4. The system of claim 1, wherein the photon source is attached to or included in:
   a geosynchronous satellite;
   a low earth orbit (LEO) satellite;
   an aircraft;
   a drone; or
   an aerial platform.

5. The system of claim 1, wherein the one or more quantum memory devices are further configured to store asynchronously-received photons into different memory locations within the one or more quantum memory devices.

6. The system of claim 1, wherein the optical ground station is located at a data center of a service provider network.

7. The system of claim 1, wherein the optical ground station is located at a co-location facility outside of a trusted perimeter of a service provider network.

8. A method of distributing quantum entanglement comprising:
   receiving a request for distribution of quantum entanglement; and
   distributing quantum entanglement across an optical ground station and a communications hub, wherein said distributing comprises:
      receiving heralding signals from one or more quantum memory devices indicating that two photons have been received at the one or more quantum memory devices via a free-space or atmospheric channel connected to the optical ground station and via a given one of a plurality of fiber optic links connected to the communications hub, respectively; and
      extending quantum entanglement from the free-space or atmospheric communication channel to the given one of the plurality of fiber optic links.

9. The method of claim 8, wherein said extending quantum entanglement from the free-space or atmospheric communication channel to the given one of the plurality of fiber optic links comprises performing joint measurements on the two received photons.

10. The method of claim 9, wherein performing joint measurements comprises performing a non-destructive, spin correlation measurement between the two received photons.

11. The method of claim 8, further comprising:
    asynchronously storing the two photons received via the free-space or atmospheric channel and via the given one of the plurality of fiber optic links into different memory locations within the one or more quantum memory devices.

12. The method of claim 8, wherein said distributing the quantum entanglement further comprises:
    distributing the quantum entanglement to a first endpoint of a customer, located at another one of the plurality of fiber optic links connected to the communications hub; and
    distributing the quantum entanglement to a second endpoint of the customer, wherein the distribution of the quantum entanglement occurs via the optical ground station and the communications hub.

13. The method of claim 8, wherein said distributing the quantum entanglement further comprises:
    distributing the quantum entanglement to an endpoint of a first customer, located at another one of the plurality of fiber optic links connected to the communications hub; and
    distributing the quantum entanglement to an endpoint of a second customer, wherein the distribution of the quantum entanglement occurs via the optical ground station and the communications hub.

14. The method of claim 13, wherein said distributing the quantum entanglement to the endpoint of the customer and to the endpoint of the different customer further comprises:

determining an entanglement relationship between respective received photons based, at least in part, on performing joint measurements on the respective received photons; and providing information about the determined entanglement relationship to the endpoint of the first customer and to the endpoint of the second customer.

15. The method of claim 14, further comprising:

coordinating distribution of data, via the distribution of the quantum entanglement, wherein the distribution of the data provides a quantum secure connection for the first customer and the second customer based, at least in part, on the determined entanglement relationship.

16. One or more non-transitory, computer-readable, storage media storing program instructions, that when executed on or across one or more processors, cause the one or more processors to:

receive a request for distribution of quantum entanglement; and cause quantum entanglement to be distributed across an optical ground station and a communications hub, wherein to perform the distribution, the program instructions, when executed on or across the one or more processors, cause the one or more processors to:

be configured to receive heralding signals from one or more quantum memory devices indicating that two photons have been received at the one or more quantum memory devices via a free-space or atmospheric channel connected to the optical ground station and via a given one of a plurality of fiber optic links connected to the communications hub, respectively; and cause, in response to receiving the heralding signals, quantum entanglement to be extended from the free-space or atmospheric communication channel to the given one of the plurality of fiber optic links.

17. The one or more non-transitory, computer-readable, storage media of claim 16, wherein to distribute the quantum entanglement, the program instructions further cause the processors to:

cause distribution of the quantum entanglement to an endpoint of a first customer, located at another one of the plurality of fiber optic links connected to the communications hub; and cause distribution of the quantum entanglement to an endpoint of a second customer, wherein the distribution of the quantum entanglement occurs via the optical ground station and the communications hub.

18. The one or more non-transitory, computer-readable, storage media of claim 17, wherein to cause the distribution of the quantum entanglement, the program instructions further cause the processors to:

determine an entanglement relationship between respective received photons based, at least in part, on joint measurements performed on the respective received photons; and provide information about the determined entanglement relationship to the endpoint of the first customer and to the endpoint of the second customer.

19. The one or more non-transitory, computer-readable, storage media of claim 18, wherein the program instructions further cause the processors to:

cause distribution of data, via the distribution of the quantum entanglement, wherein the distribution of the data provides a quantum secure connection for the customer and the different customer based, at least in part, on the determined entanglement relationship.

20. The one or more non-transitory, computer-readable storage media of claim 16, wherein, to cause the distribution of the quantum entanglement, the program instructions further cause the one or more processors to:

update a database of stored photon locations available to be used for distribution of the quantum entanglement.

* * * * *